United States Patent
Li et al.

(10) Patent No.: US 10,046,417 B2
(45) Date of Patent: Aug. 14, 2018

(54) LEAD-FREE SOLDER COMPOSITIONS

(71) Applicant: Honeywell International Inc., Morris Plains, NJ (US)

(72) Inventors: Jianxing Li, Tualatin, OR (US); Michael R. Pinter, Spokane, WA (US); Vikki L. Johnson, Spokane, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/119,453

(22) PCT Filed: Feb. 20, 2014

(86) PCT No.: PCT/US2014/017418
§ 371 (c)(1),
(2) Date: Aug. 17, 2016

(87) PCT Pub. No.: WO2015/126403
PCT Pub. Date: Aug. 27, 2015

(65) Prior Publication Data
US 2017/0008131 A1    Jan. 12, 2017

(51) Int. Cl.
*B23K 35/36* (2006.01)
*B23K 35/02* (2006.01)
*C22C 12/00* (2006.01)
*C22F 1/16* (2006.01)
*B23K 35/26* (2006.01)
*B21C 23/08* (2006.01)

(52) U.S. Cl.
CPC .......... *B23K 35/0227* (2013.01); *B21C 23/08* (2013.01); *B23K 35/264* (2013.01); *C22C 12/00* (2013.01); *C22F 1/16* (2013.01)

(58) Field of Classification Search
None
See application file for complete search history.

(56) References Cited

U.S. PATENT DOCUMENTS

| | | |
|---|---|---|
| 4,559,078 A | 12/1985 | Maier et al. |
| 4,929,423 A | 5/1990 | Tucker et al. |
| 5,019,336 A | 5/1991 | Liebermann et al. |
| 5,242,658 A | 9/1993 | Stevens et al. |
| 5,411,703 A | 5/1995 | Gonya et al. |
| 5,527,628 A | 6/1996 | Anderson et al. |
| 5,851,482 A | 12/1998 | Kim |
| 5,980,822 A | 11/1999 | Moon et al. |
| 6,027,575 A | 2/2000 | Paruchuri et al. |
| 6,156,132 A | 12/2000 | Yamashita et al. |

(Continued)

FOREIGN PATENT DOCUMENTS

| | | |
|---|---|---|
| CN | 1927525 B | 3/2007 |
| CN | 101092006 A | 12/2007 |

(Continued)

OTHER PUBLICATIONS

Extended European Search Report issued in EP Application 14883081.3, dated Oct. 20, 2017, 10 pages.

(Continued)

*Primary Examiner* — Daniel J. Schleis
(74) *Attorney, Agent, or Firm* — Faegre Baker Daniels LLP

(57) ABSTRACT

A solder wire composition may include 85 to 95 weight percent bismuth, and at least 5 weight percent copper. The solder wire composition may have a diameter of less than about 1 millimeter, and an elongation at break of at least 20%.

10 Claims, 1 Drawing Sheet

(56) References Cited

U.S. PATENT DOCUMENTS

| | | |
|---|---|---|
| 6,176,947 B1 | 1/2001 | Hwang et al. |
| 6,179,935 B1 | 1/2001 | Yamashita et al. |
| 6,180,264 B1 | 1/2001 | Takaoka et al. |
| 6,184,475 B1 | 2/2001 | Kitajima et al. |
| 6,228,322 B1 | 5/2001 | Takeda et al. |
| 6,241,942 B1 | 6/2001 | Murata et al. |
| 6,319,461 B1 | 11/2001 | Domi et al. |
| 6,361,626 B1 | 3/2002 | Kitajima et al. |
| 6,563,225 B2 | 5/2003 | Soga et al. |
| 6,726,907 B1 | 4/2004 | Zhang et al. |
| 6,840,434 B2 | 1/2005 | Clay et al. |
| 6,893,512 B2 | 5/2005 | Kitajima et al. |
| 6,926,849 B2 | 8/2005 | Taguchi et al. |
| 7,187,083 B2 | 3/2007 | Lewis et al. |
| 7,256,501 B2 | 8/2007 | Okamoto et al. |
| 7,282,174 B2 | 10/2007 | Hirata et al. |
| 7,282,175 B2 | 10/2007 | Amagai et al. |
| 7,681,777 B2 | 3/2010 | Hirata et al. |
| 7,682,468 B2 | 3/2010 | Munekata et al. |
| 7,749,340 B2 | 7/2010 | Huang et al. |
| 7,750,475 B2 | 7/2010 | Souma et al. |
| 7,800,230 B2 | 9/2010 | Hirano et al. |
| 7,806,994 B2 | 10/2010 | Smith et al. |
| 7,854,996 B2 | 12/2010 | Sato et al. |
| 7,993,758 B2 | 8/2011 | Wilhelm et al. |
| 8,227,536 B2 | 7/2012 | Watanabe et al. |
| 2001/0000321 A1 | 4/2001 | Takeda et al. |
| 2003/0189086 A1 | 10/2003 | Clay et al. |
| 2005/0082337 A1 | 4/2005 | Riedl |
| 2006/0125105 A1 | 6/2006 | Kitajima et al. |
| 2006/0145352 A1 | 7/2006 | Soga et al. |
| 2006/0210790 A1 | 9/2006 | Horio et al. |
| 2008/0118761 A1 | 5/2008 | Weiser et al. |
| 2008/0292493 A1 | 11/2008 | Lee et al. |
| 2009/0053555 A1 | 2/2009 | Nose et al. |
| 2009/0129971 A1 | 5/2009 | Riedl |
| 2009/0139608 A1 | 6/2009 | Tanaka et al. |
| 2009/0220812 A1 | 9/2009 | Kato et al. |
| 2009/0263053 A1 | 10/2009 | Andler |
| 2009/0270963 A1 | 10/2009 | Pelger et al. |
| 2009/0301607 A1 | 12/2009 | Nakano et al. |
| 2010/0012708 A1 | 1/2010 | Steward et al. |
| 2010/0109016 A1 | 5/2010 | Yagi et al. |
| 2010/0116376 A1 | 5/2010 | Huang et al. |
| 2010/0148367 A1 | 6/2010 | Matsuo et al. |
| 2010/0193801 A1 | 8/2010 | Yamada et al. |
| 2010/0294565 A1 | 11/2010 | Kawamata et al. |
| 2011/0132451 A1 | 6/2011 | von Campe et al. |
| 2011/0204121 A1 | 8/2011 | Kawamata et al. |
| 2012/0055586 A1 | 3/2012 | McIsaac et al. |
| 2012/0313230 A1 | 12/2012 | Mengel et al. |
| 2013/0045131 A1 | 2/2013 | Li et al. |
| 2013/0094991 A1 | 4/2013 | Nagata et al. |
| 2013/0259738 A1 | 10/2013 | Snugovsky et al. |
| 2015/0004427 A1 | 1/2015 | Li et al. |

FOREIGN PATENT DOCUMENTS

| | | |
|---|---|---|
| CN | 101380701 A | 3/2009 |
| CN | 102285792 B | 12/2011 |
| CN | 104169041 A | 11/2014 |
| DE | 19816671 C2 | 10/1998 |
| DE | 19904765 B4 | 8/1999 |
| EP | 0704272 B1 | 4/1996 |
| EP | 0855242 B1 | 7/1998 |
| EP | 0976489 A1 | 2/2000 |
| EP | 0988920 A1 | 3/2000 |
| EP | 1043112 B1 | 10/2000 |
| EP | 1112803 B1 | 7/2001 |
| EP | 1952934 A1 | 8/2008 |
| EP | 2228168 A1 | 9/2010 |
| JP | 56013456 A | 2/1981 |
| JP | 11172352 A | 6/1999 |
| JP | 2000061686 A | 2/2000 |
| JP | 2000094181 A | 4/2000 |
| JP | 2002307188 A | 10/2002 |
| JP | 2004238720 A | 6/2004 |
| JP | 2004528992 A | 9/2004 |
| JP | 2004533327 A | 11/2004 |
| JP | 2004358539 A | 12/2004 |
| JP | 2006088205 A | 4/2006 |
| JP | 2006212660 A | 8/2006 |
| JP | 2006289493 A | 10/2006 |
| JP | 2006320913 A | 11/2006 |
| JP | 2006322027 A | 11/2006 |
| JP | 2009142849 A | 7/2009 |
| JP | 2009203545 A | 9/2009 |
| JP | 2009538176 A | 11/2009 |
| JP | 2010069502 A | 4/2010 |
| JP | 2010155268 A | 7/2010 |
| JP | 2011056555 A | 3/2011 |
| JP | 20111156558 A | 8/2011 |
| JP | 2011224598 A | 11/2011 |
| JP | 2011238838 A | 11/2011 |
| JP | 2011528493 A | 11/2011 |
| JP | 2011251329 A | 12/2011 |
| JP | 2011251330 A | 11/2015 |
| SU | 1731547 A1 | 5/1992 |
| WO | 1995020460 A1 | 8/1995 |
| WO | 2002009936 A1 | 2/2002 |
| WO | 2007045191 A2 | 4/2007 |
| WO | 2009051240 A1 | 4/2009 |
| WO | 2012029470 A1 | 3/2012 |
| WO | 2013025990 A2 | 2/2013 |
| WO | 2015126403 A1 | 8/2015 |

OTHER PUBLICATIONS

Chakrabarti et al. The Bi—Cu (Bismuth-Copper) System, Bulletin of Alloy Phase Diagrams, vol. 5 No. 2, 1984, pp. 148-155.

Chen, Kang-I et al., The Microstructures and Mechanical Properties of the Sn—Zn—Ag—Al—Ga Solder Alloys—The Effect of Ga, Journal of Electronic Materials, vol. 32, No. 10 2003, pp. 1111-1116.

Csanady, A. et al., "The Influence of Some Alloying Additions (Cr, Cu, and Li) on the Thermal Oxidation of Al—Zn—Mg Alloys", Corrosion Science, vol. 22, No. 7, pp. 689-713, 1982.

Hae-Young, Cho et al., "A New Ni—Zn Under Bump Metallurgy for Pb-free Solder Bump Flip Chip Application", 2010 IEEE, Electronic Components and Technology Conference, pp. 151-155.

Haque, A. et al., "Die Attach Properties of Zn—Al—Mg—Ga Based High-Temperture Lead-Free solder on Cu Lead-Frame", Journal of Materials Science: Materials in Electronics, vol. 23, No. 1, published online Sep. 7, 2011, pp. 115-123.

International Search Report and Written Opinion issued in PCT/US2012/051343, dated Feb. 18, 2013, 7 pages.

International Search Report and Written Opinion] issued in PCT/US2001/022778, dated Nov. 6, 2001, 2 pages.

International Search Report issued in PCT/US2014/017418, dated Nov. 28, 2014, 3 pages.

Kwang-Lung, Lin et al., "Improvements in the Properties of Sn—Zn Eutectic Based Pb-Free Solder", 2003 IEEE, Electronic Components and Technology Conference, pp. 658-663.

Kwang-Lung, Lin et al., "The Bonding of Sn—Zn—Ag—Al—Ga Free Solder Balls on Cu/Ni—P/Au BGA Substrate", 2005 IEEE, Electronic Components and Technology Conference, pp. 692-695.

Kwang-Lung, Lin et al., "The Electromigration Investigation of the Newly Developed Pb-Free Sn—Zn—Ag—Al—Ga Free Solder Balls Interconnect", 2007 IEEE, Electronic Components and Technology Conference, pp. 1467-1471.

Kwang-Lung, Lin et al., "The Wetting Interaction Between Pb-Free Sn—Zn Series Solders and Cu, Ag Substrates", 2004 IEEE, Electronic Components and Technology Conference, pp. 1310-1313.

Li, Jianxing et al., "High Melting Temperature Lead Free Solder for Die Attach Application", IMAPS 2011, 44th International Symposium of Microelectronics, Long Beach Convention Center, Long Beach, California USA, Oct. 9-13, 2011, www.imaps2011.org.

Li, Jianxing et al., "High Melting Temperature Lead Free Solder for Die Attach Application", IMAPS 2011, 44th International Symposium of Microelectronics, Long Beach, California, Oct. 9-13, 2011.

(56) References Cited

OTHER PUBLICATIONS

Rettenmayr, M. et al., "Zn—Al Based Alloys as Pb-Free Solders for Die Attach",Journal of Electronic Materials, vol. 28, No. 11, 1999, pp. 1172-1175.

Shimizu, T. et al., "Zn—Al—Mg—Ga Alloys as Pb-Free Solder for Die Attaching Use", Journal of Electronic Materials, vol. 28, No. 11, 1999, pp. 1172-1175.

Supplementary European Search Report issed in EP Application No. 01984406, dated Sep. 5, 2005, 3pages.

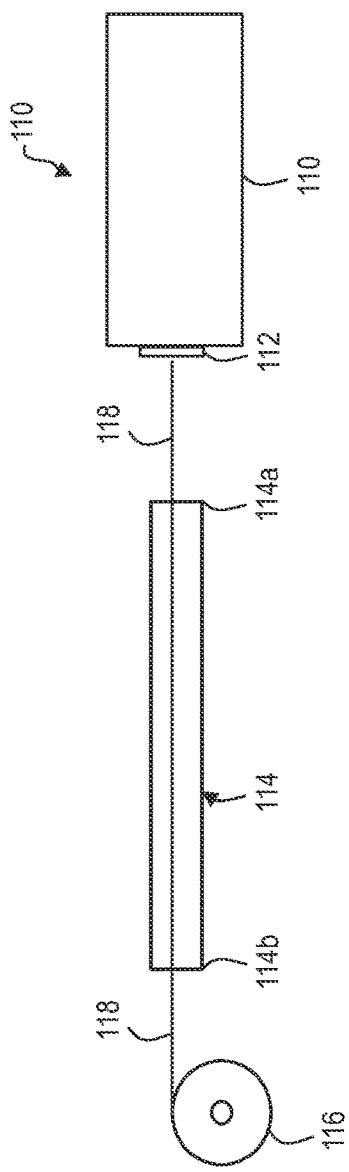
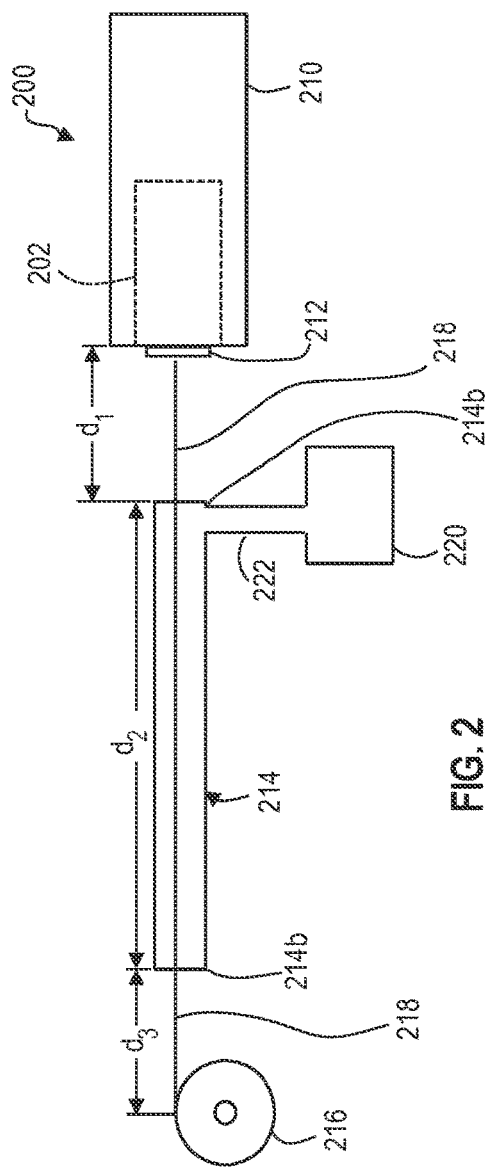

LEAD-FREE SOLDER COMPOSITIONS

CROSS-REFERENCE TO RELATED APPLICATIONS

This application is the U.S. national stage of PCT/US2014/017418, filed Feb. 20, 2014, published as WO 2015/126403 on Aug. 27, 2015, which is hereby incorporated by reference herein in its entirety.

This application is related to U.S. application Ser. No. 13/586,074, filed Aug. 15, 2012 and PCT Application No. PCT/US2012/051343, filed Aug. 17, 2012, which each claims priority to U.S. Provisional Application No. 61/524,610, filed Aug. 17, 2011. Each of the identified applications are herein incorporated by reference in their entirety.

TECHNICAL FIELD

The present disclosure relates to solder materials and more particularly to solder materials that are free or substantially free of lead.

BACKGROUND

Solder materials are used in the manufacture and assembly of a variety of electromechanical and electronic devices. In the past, solder materials have commonly included substantial amounts of lead to provide the solder materials with desired properties such as melting point, wetting properties, ductility and thermal conductivities. Some tin-based solders have also been developed. More recently, there have been attempts at producing lead-free and tin-free solder materials that provide desired performance.

SUMMARY

In some embodiments, a solder wire composition may include 85 to 95 weight percent bismuth, and at least 5 weight percent copper. The solder wire composition may have a diameter of less than about 1 millimeter, and an elongation at break of at least 20%.

In some embodiments, a method of forming a solder wire is provided. The method may include extruding a billet to form a solder wire having a diameter of less than about 1 millimeter, heat treating the extruded wire at a temperature of between about 93° C. and about 121° C.; and winding the heat treated extruded wire onto a spool while the extruded wire is above its solidus temperature.

In some embodiments, a solder composition may include about 85 to 95 weight percent bismuth, about 8 to 12 weight percent copper, and about 0.001 to 0.1 weight percent gallium.

While multiple embodiments are disclosed, still other embodiments of the present invention will become apparent to those skilled in the art from the following detailed description, which shows and describes illustrative embodiments of the invention. Accordingly, the detailed description is to be regarded as illustrative in nature and not restrictive.

BRIEF DESCRIPTION OF THE DRAWINGS

FIG. 1 is a block diagram schematic of one embodiment of a wire extrusion process.

FIG. 2 shows an experimental schematic for wire extrusion.

DETAILED DESCRIPTION

Solder compositions are fusible metal and metal alloys used to join two substrates or work pieces and have melting points below that of the work pieces. A solder composition, such as those used for die attach applications in the semiconductor industry, may be provided in many different forms, including but not limited to, bulk solder products, solder pastes and solder wires.

A solder paste can be a fluid or putty-like material that may be applied to the substrate using various methods, including but not limited to printing and dispensing, such as with a syringe. Example solder paste compositions may be formed by mixing powdered metal solder with a flux, a thick medium that acts as a temporary adhesive. The flux may hold the components of the solder paste together until the soldering process melts the powdered solder. Suitable viscosities for a solder paste may vary depending on how the solder paste is applied to the substrate. Suitable viscosities for a solder paste include 300,000-700,000 centipoise (cps).

In other embodiments, the solder composition may be provided as a solder wire. Solder wires may be formed by drawing solder material through a die to provide a thin solder wire on a spool. Suitable solder wires may have a diameter less than about 1 millimeter (mm). In some embodiments, the solder wire may have a diameter as small as 0.1, 0.25 or 0.63 mm or as great as 0.75, 0.8 or 1 mm or within any range delimited by any pair of the foregoing values. For example, in certain embodiments the solder wire may have a diameter from about 0.25 to about 0.8 mm, and more specifically from about 0.63 to about 0.75 mm. In some embodiments, the solder wire is capable of being rolled or coiled on a spool without breaking into two or more pieces.

Regardless of form, a solder composition can be evaluated based on suitable physical properties, such as its solidus temperature, melting temperature range, wetting property, ductility, and thermal conductivity. The solidus temperature quantifies the temperature at which the solder material begins to melt. Below the solidus temperature, the solder material is completely solid. In some embodiments, the solidus temperature may be around 300° C. to allow step soldering operations and to minimize thermal stress in the end use device.

The melting temperature range of a solder composition is defined by the solidus temperature and a liquidus temperature. The liquidus temperature quantifies the temperature above which the solder material is completely melted. The liquidus temperature is the maximum temperature in which crystals (e.g., solids material) can coexist with a melt (e.g., liquid material). Above the liquidus temperature, the solder material is a homogeneous melt or liquid. In some embodiments, it may be preferable to have a narrow melting temperature range to minimize the range at which the solder exists in two phases.

Wetting refers to the ability of a solder to flow and wet the surface of a substrate or work piece. A greater extent of wetting will generally provide an increased bond strength between work pieces. Wetting may be measured using a dot wet test.

Elongation is a measure of the ductility of the wire determined in a tensile test. A higher elongation indicates higher ductility. Elongation of solder wires can be determined with an Instron 4465 machine at room temperature according to ASTM E8, entitled "Standard Test Methods for Tension Testing of Metallic Materials." In some embodiments, the solder wire has an elongation of at least about 20%, 25%, 30% or 35%.

Elastic modulus is a mathematical description of the tendency of a solder wire to be deformed elastically (e.g., non-permanently) responsive to an applied force. In some embodiments, the solder wire has an elastic modulus below about 15 GPa, below about 12 GPa, or below about 10 GPa.

All solder joints experience reduced solder joint strength in the end device over the device lifetime. A solder with an increased ductility will prolong the device lifetime and is more desirable. A ductile solder may also be desirable in the fabrication of solder wires as described further herein to enable the solder wire to be coiled or rolled onto a spool.

High thermal conductivity may also be desired for device performance. In some embodiments, the solder material may connect a die to a lead frame. In such embodiments, it may be desirable for the solder to conduct heat into the lead frame. In some examples, high thermal conductivity is particularly desirable for high-power applications. In certain embodiments, a suitable solder material may have a thermal conductivity greater than 20 watts per meter Kelvin (W/m-K). In other embodiments, a suitable solder material may have a thermal conductivity greater than 10 W/m-K or from 10 W/m-K to about 25 W/m-K. In still further embodiments, a suitable solder material has a thermal conductivity as little as 10, 12, 14 W/m-K or as great as 15, 18, 20 or 25 W/m-K or within any range delimited by any pair of the foregoing values.

A solder material, such as the present bismuth/copper solder, can be lead free. As used herein, "lead free" refers to solder materials including less than 0.1 wt % lead. In certain embodiments, the solder material, such as the present bismuth/copper solder, can be tin free. As used herein, "tin free" refers to solder materials including less than 0.1 wt % tin.

In some embodiments, a bismuth/copper based solder material may include bismuth in an amount as small as 85, 88 or 90 weight percent or as great as 92, 93 or 95 weight percent or within any range delimited by any pair of the foregoing values, and copper in an amount as small as 5, 8 or 10 weight percent or as great as 11, 12 or 15 weight percent or within any range delimited by any pair of the foregoing values. For example, a bismuth/copper based solder material may include about 85 to about 95 weight percent bismuth and about 5 to about 15 weight percent copper, and more particularly, from about 88 to about 92 weight percent bismuth and about 8 to about 12 weight percent copper. Dopants such as gallium, indium, phosphorous and/or germanium may be present in an amount as little as 0.001, 0.01, 0.05, or 0.075 weight present or in an amount as great as 0.1, 0.25, 0.5. 0.75, or 1 weight present or may be present within any range delimited by any pair of the foregoing values. Suitable bismuth/copper solder materials may include at least about 10 weight percent copper and a remainder bismuth and dopant. For example, a bismuth/copper based solder may include about 89-90 weight percent bismuth, about 10 weight percent copper and a dopant. The solder composition may include only one dopant material, or may include a combination of two or more dopant materials In some embodiments, a bismuth/copper based solder material may consist of about 10 weight percent copper, about 0.1 weight percent dopant, and a balance of bismuth. The dopant may be a single material of those listed above, or may be a combination thereof. In some embodiments, the dopant may be gallium.

Bismuth/copper based solder materials may exhibit lower melting temperatures and thermal conductivity and thus may be suitable for low power applications than other solder materials, such as zinc/aluminum based solder materials.

Bismuth/copper based solders including a large amount of copper, such as solder including 5 percent or more by weight copper, are typically too brittle to be formed into a wire using conventional wire extrusion and spooling techniques. A system 100 which overcomes the above described brittleness is shown in FIG. 1. System 100 includes extruder 110 having die 112, heating zone 114, and spool 116.

In some embodiments, a suitable solder material, such as the solder materials having the composition described above, is formed as a billet and is extruded into solder wire 118 using extruder 110 and die 112. After extrusion, wire 118 enters heating zone 114 at entrance 114a and exits at exit 114b. Extruded and heat treated wire 118 is then wound onto spool 116.

A suitable solder material may be formed into a billet by casting melted solder material. In some embodiments, the cast billet may be about 25 mm (1 inch) in diameter and about 102 mm (4 inches long), although the cast billet may be any size suitable for operative use with extruder 110.

Extruder 110 is operated at sufficient pressures and temperatures to press the billet through die 112. In some embodiments, extruder 110 is operated at a temperature that is sufficiently high enough to soften but not melt the solder billet. For example, extruder 110 may be operated above the solidus temperature and below the liquidus temperature for the solder material. For example, a solder billet formed of the compositions described above and having a melting temperature of about 270° C., may be extruded in extruder 110 operated at a temperature as low as about 210, 220 or 230° C. or a temperature as high as 230, 240 or 250° C. or at a temperature within any range delimited by any pair of the foregoing values.

In some embodiments, extruder 110 may be operated at pressures of greater than 11,721 KPa (1700 psi). For example, extruder 110 may be operated at a pressure as little as 11,721 KPa (1700 psi), 12,066 KPa (1750 psi), 12,410 KPa (1800 psi) or 12,755 KPa (1850 psi) or as great as 12,755 KPa (1850 psi), 13,100 KPa (1900 psi) or 13,445 KPa (1950 psi) or may be present within any range delimited by any pair of the foregoing values. In some embodiments, the high pressure (e.g., pressure greater than 11,721 KPa (1700 psi)) can increase the strength of wire 118. In some embodiments, the solder material may be extruded at a temperature from about 220 to about 250° C. and a pressure of about 12,410 KPa (1800 psi) to about 13,445 KPa (1950 psi).

The extruded wire 118 has a diameter smaller than the diameter of the cast billet. Suitable solder wires may have a diameter less than about 1 millimeter (mm). In some embodiments, the solder wire may have a diameter as small as 0.1, 0.25 or 0.63 mm or as great as 0.75, 0.8 or 1 mm or within any range delimited by any pair of the foregoing values. For example, in certain embodiments the solder wire may have a diameter from about 0.25 to about 0.8 mm, and more specifically from about 0.63 to about 0.75 mm.

Extrusion can cause extrusion stress in wire 118 which, in some embodiments, can cause the resulting wire 118 to be too brittle to be coiled on spool 116. Heating zone 114 is used to thermally treat or anneal the wire 118. Heating zone 114 may be any heating device or method sufficient to heat wire 118. For example, heating zone 114 may be a furnace, such as a tube furnace, or any other device which uses forced air or radiant heat. In some embodiments, forced air heat may be directed from the source directly onto wire 118. In other embodiments, wire 118 may pass through and be surrounded by a tube through which hot air is forced.

The length and temperature of the heat treatment process of heating zone 114 is sufficient to reduce or remove stress, such as extrusion stress, in wire 118. In some embodiments, heating zone 114 is operated at about 93° C. to 121° C. (200°

F. to 250° F.) and the wire is exposed to the heat treatment for as little as 8, 10 or 15 seconds or as great as 15, 30 or 60 seconds or for a value within any range delimited by any pair of the foregoing values. That is, it may take as little as 5, 10 or 15 seconds or as long as 15, 30 or 60 seconds or a value within any range delimited by any pair of the foregoing values for wire 118 to travel from entrance 114a of heating zone 114 to exit 114b of heating zone 114. In one example, heating zone 114 is about 305 mm (1 foot) long (e.g., one foot from entrance 114a to exit 114b), and wire 118 moves through heating zone 114 at a rate of about 4 to 8 feet per minute.

After passing through heating zone 114, wire 118 is wound on spool 116. In some embodiments, spool 116 may have an inner hub diameter of 51 mm (2 inches) and two outer flanges having diameters of 102 mm (4 inches). As described herein, as the wire is wound on the spool 116, portions of the wire closest to the inner hub are wound to an effective diameter of approximately 51 mm. As additional wire is wound on the spool, the effective diameter of the spool decreases due to the underlying wire and the effective diameter of the spool after a plurality of coils of wire are formed on the inner hub may be closer to 102 mm (the diameter of the flanges) than to 51 mm (the diameter of hub of the spool). A successfully extruded wire 118 should be able to be rolled onto spool 116 without breaking into two or more pieces.

Wire 118 may cool quickly after heating zone 114 because of the small diameter of wire 118. In some embodiments, heating zone 114 may sufficiently heat wire 118 such that the wire is in a softened state as it is wound on spool 116. For example, wire 118 may be above its solidus temperature but below its liquidus temperature when wound on spool 116. In some embodiments, heating zone 114 and spool 116 may be spaced so that not more than 10 seconds elapse from when wire 118 exits heating zone 114 and is coiled on spool 116. In other embodiments, not more than 30 seconds elapse from when wire 118 exits heating zone 114 and is coiled on spool 116.

As described herein, system 10 provides a solder wire having improved wire ductility. The system 10 also improves the manufacturability of the wire.

Example 1

I. Formation of Bismuth/Copper Solder Alloy Billets

Bismuth/copper solder alloys were formed by casting bismuth, copper and gallium in a nitrogen atmosphere into one inch diameter billets.

II. Test Procedures

FIG. 2 illustrates an exemplary experimental wire extrusion and winding apparatus. The solder alloy billets 202 were extruded in extruder 212 with a die 212 at 220-250° C. and a pressure of 12,410 KPa (1800 psi) to 13,445 KPa (1950 psi) to form solder wires 218 having a diameter of about 0.762 mm (0.030 inch). Following extrusion, the solder wire 218 was fed through a heating zone. The heating zone was formed by feeding the solder wire 218 axially through a tube or tunnel 214. The ends (214a and 214b) of tube were open to allow the solder wire 218 to enter and exit. Hot air from a heat gun 220 was direction through the tube 214 so that air in the tube 214 was maintained at about 93 to 121° C. (200 to 250° F.).

The solder wire was wound onto a spool 216 having an inner hub diameter of 51 mm (2 inches) and two outer flanges having diameters of 102 mm (4 inches). Successfully extruded wires could be rolled onto the spool without breaking into two or more pieces.

The solder wire is moved through the system (e.g., from the extruder to the spool) at a speed of about 1.2 to 2.4 meters per second (4 to 8 feet per second). The distance d1 between the die 212 and the entrance 214a of the heat tube 214 was about 303 mm (1 foot). Tube 214 was about 303 mm (1 foot) long. That is, d2 was about 305 mm. The distance d3 between the exit 214b of the tube 214 and spool 216 was spaced so that it took no more than 10 second for the wire 218 to move from exit 214b to spool 216.

The melting characteristics of the solder wires were determined by differential scanning calorimetry ("DSC") using a Perkin Elmer DSC7 machine. The melting temperature was determined as the temperate at which the material began to melt.

A NETZSCH LFA 447 NanoFlash® instrument was used to test the thermal conductivity according to ASTM E1461 standard. To test the through-plane conductivity, the sample size is 10×10×0.8 mm and a standard 10×10 mm square sample hold is used.

Thermal expansion was determined with a Perkin Elmer TMA 7 thermo-mechanical analyzer (TMA).

The electrical resistance of the solder materials was determined by measuring the sample resistance under a given voltage at a given length range using an electrical meter. The resistivity was calculated using the resistance and the sample cross sectional area.

Elastic modulus was determined by testing either a cast billet or extruded wire with an Instron 4465 machine at room temperature.

Tensile strength was determined by testing either a cast billet or extruded wire with an Instron 4465 machine at room temperature.

Elongation of the solder wires were determined with an Instron 4465 machine at room temperature according to ASTM E8, entitled "Standard Test Methods for Tension Testing of Metallic Materials."

III. Results

The billets were extruded through a die to form a 0.030 inch diameter wire and were rolled onto a spool. Table 1 presents the properties of a solder wire containing 10 weight percent copper, 0.1 weight percent gallium and remainder bismuth extruded according to the experimental setup of FIG. 2.

TABLE 1

Properties of Bi10Cu0.1Ga Solder Wire

|  | Bi10Cu0.1Ga |
|---|---|
| Melting temperature (C.) | 272 |
| Density (g/cm3) | 9.8 |
| Heat capacity (J/g-K) | 0.20 |
| Through-plane thermal conductivity (W/m-K) | 18.2 |
| Thermal expansion (ppm/C.) | 12.5 |
| Electrical Resistance (μΩ · cm) | 56.4 |
| Elastic Modulus (GPa) | 10.1 |
| Tensile Strength (MPa) | 56.8 |
| Elongation at Break (%) | 41.3 |

Example 2

Bismuth/copper solder billets were formed as described above with respect to Example 1. The solder alloy billets were extruded with a die at 250-300° C. and 1500-1800 pounds per square inch (psi) to form solder wires having a diameter of about 0.762 mm (0.030 inch) at an extrusion speed of 2.1-3.0 meters per minute (7-10 feet per minute). The extruded solder wires were not subjected to a heat treatment process following the extrusion process. Solder wires containing 10 weight percent copper, 0.1 weight percent gallium and remainder bismuth could not be successfully wound onto a spool having an inner hub diameter of 51 mm (2 inches) and two outer flanges having diameters of 102 mm (4 inches). More specifically, the solder wires broke into two or more pieces when it was attempted to wind them onto the spool.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

We claim:

1. A solder wire composition comprising:
   about 85 to 95 weight percent bismuth; and
   at least 5 weight percent copper,
   wherein the solder wire has a diameter of less than about 1 millimeter, and
   wherein the solder wire has an elongation at break of at least 20%.

2. The solder composition of claim 1, comprising:
   about 5 to 15 weight percent copper; and
   about 0.01 to about 1 weight percent gallium.

3. The solder composition of claim 1, comprising:
   about 5 to 15 weight percent copper; and
   about 0.01 to about 0.1 weight percent gallium.

4. The solder composition of claim 1, comprising:
   about 8 to 10 weight percent copper; and
   about 0.01 to about 0.5 weight percent gallium.

5. The solder composition of claim 1, comprising:
   about 10 weight percent copper; and
   about 0.1 weight percent gallium.

6. The solder composition of claim 1, and further comprising:
   less than about 0.1 weight percent lead.

7. The solder composition of claim 1, and further comprising:
   less than about 0.1 weight percent tin.

8. The solder composition of claim 1, wherein the solder composition consists of bismuth, copper and less than 1 weight percent gallium.

9. The solder wire of claim 1, wherein the solder wire has an elastic modulus of less than 15 GPa.

10. The solder wire of claim 1, wherein the solder wire has a thermal conductivity greater than 10 W/m-K.

* * * * *